June 1, 1937. C. E. COLEMAN 2,082,618

EXTRUSION DEVICE

Filed Jan. 30, 1935

INVENTOR.
Clarence E. Coleman

BY Charles F. Daley
ATTORNEY.

Patented June 1, 1937

2,082,618

UNITED STATES PATENT OFFICE 2,082,618

EXTRUSION DEVICE

Clarence E. Coleman, Buffalo, N. Y., assignor, by mesne assignments, to E. I. du Pont de Nemours & Company, Wilmington, Del., a corporation of Delaware Application January 30, 1935, Serial No. 4,101

6 Claims. (Cl. 18—15)

This invention relates to the manufacture of non-fibrous, cellulosic sheets, films, tubing, and the like. More particularly, it relates to an extrusion apparatus for the production of non-fibrous, cellulosic pellicles.

Cellulosic articles of the above described nature are commonly produced by extruding a suitable cellulosic solution through an extrusion die of a specified size and shape. The method and apparatus of this invention have particular utility in the production of cellulosic articles from cellulosic solutions which are coagulated and/or regenerated by treatment with a corrosive solution, for example, sulphuric acid. This invention will be described in terms of the manufacture of regenerated cellulose articles from viscose, it being understood that the invention offers many advantages in the production of cellulosic articles other than regenerated cellulose articles, and that the invention is not to be limited thereto.

In the more common method of manufacturing regenerated cellulose films, viscose is forced through an elongated orifice, beneath the surface of a coagulating bath. From this bath, it is led in the form of a thin, continuous pellicle through several subsequent operations including additional coagulation and regeneration, purification, finishing and drying, after which it is finally obtained in the form of a glass-clear, smooth, thin, non-porous, flexible pellicle of regenerated cellulose. It is desirable that this regenerated cellulose film shall have uniform thickness and appearance in its body portion, a desideratum which can be accomplished only if the width of the orifice in the extrusion device is kept accurately, precisely, and constantly controlled over long periods of time. If the lips or side walls of the orifice are not kept in a constant position, or if they become roughened, even minutely, a streaked, inferior pellicle will be produced and repairs to the orifice will have to be made. To repair an orifice having a roughened surface, it is usually necessary to remove the extrusion device, thereby necessarily stopping the operation of an expensive machine, and consuming time and labor for the correction of the defect, and thereby decreasing the efficiency of the machine and increasing the cost of production of the product. In addition to the above disadvantages, the discovery of such defects is usually delayed and a substantial amount of defective sheeting may be produced prior to said discovery.

The orifice is customarily formed by a pair of substantially parallel metal bars, usually called hopper lips, which are attached to a hopper adjustably to regulate the thickness of the formed sheets. The hopper lips are provided with a high polish in order that they may be perfectly smooth and free from any irregularities such as may cause streaks or blemishes in the pellicle. The exit portions or essential edge of the hopper lips are submerged below the surface of the coagulating bath so that the extruded film may enter the bath below the surface thereof. The said lips are subject to severe corrosion due to the nature of the coagulating bath which contains about 12% sulfuric acid. This corrosive action is considerably increased by the chemical reaction between the viscose, which contains about 6% sodium hydroxide, and the sulfuric acid of the coagulating bath at the point where said viscose and bath liquid meet. This corrosive action on the hopper lips tends to greatly impair their smoothness which induces the streaking of the cast pellicle.

In an effort to overcome these tendencies to corrosion of the metal hopper lips many researches have been made in the art to find a suitable metal from which to construct the same. Pure nickel has been used for many years with discouraging results. Stainless steel and other alloys which have been used to some extent, have proved to be unsatisfactory. It has been suggested to use hopper lips composed of a noble metal, such as gold, or an alloy of noble metals, such as, for example, an alloy of gold and platinum. The qualities of such metal or such alloy would indicate that they would be highly successful. However, the cost and difficulty of constructing the same have been prohibitive. Furthermore, the structural characteristics of these metals, such as tensile strength, hardness, and so forth, are such that it is not possible to form unsupported structures which will retain their form sufficiently to be of use in the casting of film.

It has also been suggested to combine the useful qualities of the noble metals and their alloys with the low cost and ease of machinability of nickel by inserting in the nickel hopper lip, at the essential edge thereof, a narrow thin strip comprising a noble metal or an alloy thereof. This essential edge is defined by the section where the alkaline viscose solution and the acid coagulating bath meet. Since the form and appearance of the ultimate sheet or film are determined by the form and smooth condition of this essential edge, it is necessary to keep the noble metal insert firmly embedded in the base metal of which the hopper lip is constructed and the position of the two lips accurately regulated at a proper distance from each other. However, due to the softness and susceptibility to corrosion of nickel, it has been found difficult, if not impossible, to satisfactorily insert a strip of the character described in a set of nickel hopper lips. Furthermore, the base metal into which the noble metal is inserted must normally be of a definite crystalline form, to be suitable in the casting of regenerated cellulose film from viscose. A change in this crystalline form will cause the base metal to become much more actively corroded than is normally the case. Since the act of welding or cold rolling an insert into a base metal necessarily causes the latter to change its crystalline form, the corrosion of the same proceeds very rapidly. It is apparently due to these difficulties, under operating conditions, that the inserts were found to quickly become loose and even to fall out of their position so that these efforts had to be abandoned.

It is therefore an object of this invention to prepare suitable cellulose structures, substantially free from streaks and similar defects for extended periods of time without interruption to the process.

A further object of this invention is the provision of an extrusion device for the production of cellulosic pellicles.

Other objects of the invention will appear hereinafter.

The objects of this invention are accomplished in general by the use of an extrusion device having hopper lips composed of an alloy of a particular composition having specified metallurgical characteristics as hereinafter set forth; the side walls and the back of said hopper lips having inserts consisting of a noble metal or an alloy of a noble metal at the section where the viscose and the coagulating bath meet and for a short distance thereabout.

In copending application to Petrescu, Serial No. 705,570, filed January 6, 1934, which has become Patent 2,056,982, there is described an extrusion device for the manufacture of non-fibrous, cellulosic pellicles which device has a set of hopper lips constructed of an alloy comprising:

| | Percent |
| --- | --- |
| Nickel | 55 –60.8 |
| Chromium | 19.5 –23.8 |
| Copper | 7.5 – 9.52 |
| Molybdenum | 2.46– 4.23 |
| Tungsten | 1.57– 3.65 |
| Manganese | 1.55– 2.22 |
| Silicon | 0.56– 1.05 |
| Iron | 2.79– 4.16 |
| Carbon | 0.10– 0.29 |

The above described alloy, in order to be suitable for the casting of regenerated cellulose, should be of austenitic structure, substantially free of voids, impurities insoluble in the solid solution, grain boundary segregations and undissolved oxides and should have carbide uniformly distributed therein. However, in the instant invention, it is not necessary that these structural characteristics be as exactly observed as set forth in the Petrescu application since the critical edge of the lips, where the alkaline viscose and the acid coagulating bath meet, is not composed of this alloy. For convenience, throughout the remainder of the specification and claims, the above said alloy will be termed "Alloy G".

While hopper lips constructed of this alloy represent a great advance over the prior art, the material above described will, over a comparatively long period of time, have to be replaced or repaired in order that the resulting film will prove of uniform appearance.

Due to the hardness and comparatively high resistance to corrosion of the alloy described in the aforesaid Petrescu application and its particular suitability for the casting of alkaline materials such as viscose into a coagulating bath, I have now found that it is possible to form hopper lips superior to all previously known hopper lips, by inserting a strip comprising a noble metal or an alloy of noble metals into a set of hopper lips according to the above mentioned Petrescu application at the section where the viscose and coagulating bath meet and for some distance surrounding the same. Although the alloy used by Petrescu is not very malleable, it has been found possible to machine out a channel in a set of hopper lips of this character and to position into said channel a long, narrow strip comprising a noble metal or an alloy of noble metals and cold roll the edges of the channel against the sides of the strip, so that the strip will be firmly and permanently held in place. It has been found that the particular alloy used by Petrescu has the peculiar characteristic of withstanding a cold rolling process without substantially altering the crystalline structure of the same. Due to the ability of this alloy to withstand the cold rolling without altering the crystalline structure thereof, its susceptibility to corrosion by such cold rolling is not materially increased. The insert comprising the critical edge of the hopper lips consists of a material which is highly inert to both viscose and coagulating bath and possesses a smooth surface having or capable of receiving a high polish. A preferred material is a noble metal or alloy of noble metals, or any substance which has the aforementioned characteristics and from which, because of its high cost and structural characteristics and/or difficulty of construction, it is impractical to fabricate a complete hopper lip. Examples of suitable materials are platinum, gold, alloys of gold and platinum, palladium, iridium, tantalum, glass, ceramic materials, and the like.

Although silver and mercury are sometimes classed as noble metals, the term "noble metal" as used throughout the present specification and claims is not intended to include silver or mercury.

Figure 1:
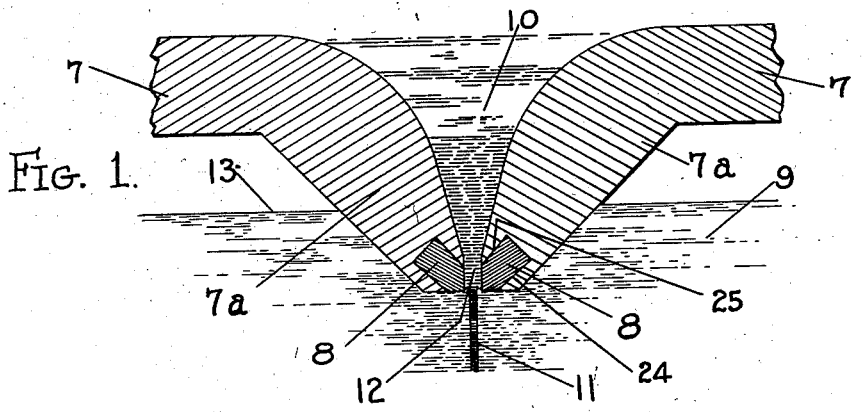
Fig. 1 is a fragmentary, sectional view showing an enlarged detail cross section of a set of hopper lips constructed in accordance with this invention.

Referring to Fig. 1 of the drawing, 7 represents the body portion of a set of hopper lips which are constructed of the above described "Alloy G". The body portion 7 comprises two spaced side walls 7a converged to form a parallel-sided slit or orifice 12. The hopper lips 7a are adapted to be submerged in a coagulating bath 9 and the internal surface of the side walls (or hopper lips) 7a form a hopper or chamber for the viscose solution 10. The extreme ends of the hopper lips are provided with slots 26 into which are placed inserts consisting of a material substantially inert to a viscose solution and coagulating bath, such as, for example, a noble metal, an alloy of noble metals, or the like. These inserts 8 comprise an inner end 29, and a wedge-shaped outer end. The two internal opposing faces 22 of the wedge-shaped outer ends are adapted to be positioned in the hopper lips at a point where the acid coagulating bath and the alkaline viscose solution meet, the viscose solution being forced from the orifice 12 into the coagulating bath to form a coagulated sheet or film. The surface defined by faces 22 represents that section of the hopper lips at which the most deleterious, corrosive and electrolytic effects are observed. It is at this point that the acid and alkaline solution come in contact with each other and it is here that the film takes its ultimate form. These faces, therefore, shall hereinafter be referred to as the essential faces of the hopper lips. The essential faces of the hopper lips must be maintained clean and smooth for extended periods of time to prevent undesirable blemishes in the film, and consequently they must be as inert to the corrosive and electrolytic effects as possible.

Figure 3:
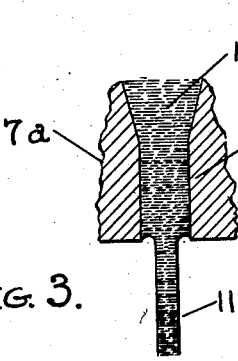
Figs. 3, 4 and 5 are diagrammatic views showing alternative ways in which the viscose may flow into the coagulating bath.
Figure 4:
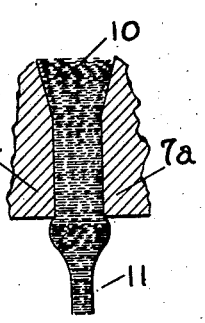
Figure 5:
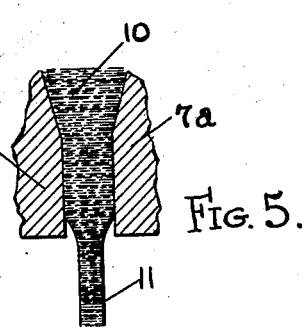

It has been found that the actual meeting line between the viscose solution and the acid bath may vary considerably due to changes in the volume of the flow of the viscose solution from the extreme edge of the orifice. These variations in the flow of the viscose solution are illustrated in the diagrammatic Figures 3, 4, and 5, and it is due to this change in the flow that the face 22 should be at least large enough to accommodate this variation.

It is also preferred to have the insert 8 extend to the bottom faces 23 of the hopper lips to allow for inaccuracies in manufacture and possible creeping of the viscose around on to this face. The extreme wedge-shaped edge 21 of the insert may be either sharply pointed or rounded as desired.

Prior to this invention attempts to satisfactorily secure inserts of the character described to nickel hopper lips by welding the same thereto have been made. However, as explained above, a hopper lip of such character will rapidly become unsuitable.

It is extremely difficult, if not impossible, to satisfactorily secure inserts to the "Alloy G" by the welding operation. The application of heat and subsequent cooling causes warpage or distortion and harmful changes in the physical structure, such as those which affect the hardness of the materials, of both insert and "Alloy G".

Figure 2:
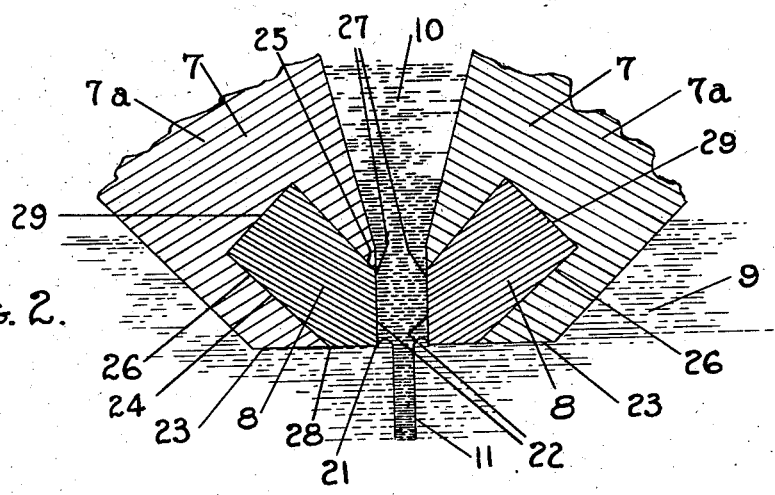
Fig. 2 is a fragmentary, sectional view showing a detail of Fig. 1.

It has been found that the following method of forming the insert and securing the same to the hopper lips, is very satisfactory. A slot 26 having parallel side walls and an end wall at right angles to the said side walls is formed at the extreme outer edge of the hopper lip in the position shown in the drawing. Into this slot is inserted a long, narrow strip composed of a substantially chemically inert substance such as a noble metal, an alloy of noble metals, or other suitable material. This strip should have a somewhat rectangular cross section with a somewhat wedge-shaped externally projecting outer end, but in which the inner end 29, or the end first inserted into the slot, while still slightly narrower than the width of the slot, is slightly wider than the section of the strip adjacent the wedge-shaped outer end. The strip should extend at least from the bottom of the slot 26 to the essential edge 21, as shown in Fig. 2.

When the strip is in position, the outer walls 24 and 25 of the slot are cold rolled so that they are caused to press inwardly against and firmly in engagement with the strip or insert 8. In this position, the distance between the outer tips 27 and 28 of the walls 24 and 25 respectively, will be permanently less than the width of the inner end of the strip 8. The strip will thus be firmly and permanently held in place.

After the cold rolling operation, the edges of the insert and the adjacent walls of the "Alloy G" are ground down and polished until they represent the form shown in the drawing. The shape and angle of the cooperating slot and insert must be such that as the faces 22 and 23 are machined back after extended use of the hopper lip, the relation between the insert and the base "Alloy G" will always remain the same and not destroy the grip of the base "Alloy G" on the insert.

Due to the peculiar non-corrodible characteristics of "Alloy G" the cold rolling necessary to keep the insert in position does not cause injury from the electrolytic action thereon, and the hopper lips will not corrode or permit the insert to become loose and thereby cause a defect in the film.

When hopper lips of the type described above are used in the preparation of cellulosic sheets and films, particularly cellulosic films regenerated from viscose, the product formed is smooth and clear and remarkably free from streaks. The essential edges of the lips remain in excellent condition for a very long time, much longer, for example, than the hopper lips constructed entirely of "Alloy G" such as described in the above mentioned Petrescu application Serial No. 705,570. They require cleaning, honing, and grinding much less frequently. They can be used indiscriminately and exchangeably in ammonium sulfate or sulfuric acid coagulating bath without affecting the life of the lips.

It is to be understood that the specific embodiment of the invention illustrated and specifically described may be varied in many details of its construction within wide limits without departing from the spirit of the invention, and that the invention is to be limited only within the terms of the appended claims.

What I claim is:

1. In a device for forming cellulosic articles by passing a cellulosic liquid through an orifice into a coagulating medium, a hopper chamber composed of "Alloy G" having an orifice therein, inserts cold rolled into the side walls of said orifice adjacent the mouth thereof, said inserts comprising a noble metal.

2. In a device for forming cellulosic articles by passing a cellulosic liquid through an orifice into a coagulating medium, a hopper chamber composed of "Alloy G" having an orifice therein, inserts cold rolled into the side walls of said orifice adjacent the mouth thereof, said inserts composed of gold.

3. In a device for forming cellulosic articles by passing a cellulosic liquid through an orifice into a coagulating medium, a hopper chamber composed of "Alloy G" having an orifice therein, inserts cold rolled into the side walls of said orifice adjacent the mouth thereof, said inserts composed of platinum.

4. In a device for forming cellulosic articles by passing a cellulosic liquid through an orifice into a coagulating medium, a hopper chamber composed of "Alloy G" having an orifice therein, inserts cold rolled into the side walls of said orifice adjacent the mouth thereof, said inserts composed of tantalum.

5. In a device for forming cellulosic articles by passing a cellulosic liquid through an orifice into a coagulating medium, a hopper chamber composed of "Alloy G" having an orifice therein, inserts cold rolled into the side walls of said orifice adjacent the mouth thereof, said inserts composed of a material substantially inert to said liquid or coagulating medium.

6. In a device for forming cellulosic articles by casting a cellulosic liquid through an orifice into a coagulating medium, a hopper chamber composed of "Alloy G" having an orifice therein, inserts cold rolled into the side walls of said orifice adjacent the mouth thereof, said inserts secured to said side walls in such a manner that the grip of the side walls on said inserts will be maintained after repeatedly grinding the adjacent faces of said inserts and side walls.

CLARENCE E. COLEMAN.